United States Patent
Cheng et al.

(10) Patent No.: US 6,259,708 B1
(45) Date of Patent: *Jul. 10, 2001

(54) SYSTEM AND METHOD OF TRANSMITTING VOICE OVER DIGITAL SUBSCRIBER LINE

(75) Inventors: Yaqi Cheng, Las Vegas, NV (US); Warren L. Franz, Dallas, TX (US); Walter Y. Chen, Franklin, MA (US); Michael O. Polley, Richardson, TX (US)

(73) Assignee: Texas Instruments Incorporated, Dallas, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/244,606

(22) Filed: Feb. 4, 1999

Related U.S. Application Data

(60) Provisional application No. 60/073,666, filed on Feb. 4, 1998.

(51) Int. Cl.[7] ............... H04J 15/00; H04J 3/00; H04L 12/16; H04L 27/04; H04L 23/00
(52) U.S. Cl. ............... 370/493; 370/201; 370/521; 370/524; 370/271; 375/295; 375/377
(58) Field of Search ............... 370/493, 535, 370/524, 360, 468, 110, 112, 118; 375/211, 295, 260, 222, 377

(56) References Cited

U.S. PATENT DOCUMENTS

| | | | |
|---|---|---|---|
| 5,410,343 | * 4/1995 | Coddington et al. | 348/7 |
| 5,479,447 | 12/1995 | Chow et al. | 375/260 |
| 5,764,628 | * 6/1998 | Davis et al. | 370/271 |
| 5,787,088 | * 7/1998 | Dagdeviren et al. | 370/493 |
| 5,883,941 | * 3/1999 | Akers | 379/93.08 |
| 5,910,970 | * 6/1999 | Lu | 375/377 |
| 5,991,311 | * 11/1999 | Long et al. | 370/524 |
| 6,002,722 | * 12/1999 | Wu | 375/295 |

OTHER PUBLICATIONS

Reeve, *Subscriber Loop Signaling and Transmission Handbook: Digital* (IEEE, 1995), pp. 60–63.

Reeve, *Subscriber Loop Signaling and Transmission Handbook: Analog* (IEEE, 1992), pp. 197–211.

* cited by examiner

*Primary Examiner*—Huy D. Vu
*Assistant Examiner*—M. Phan
(74) *Attorney, Agent, or Firm*—J. Dennis Moore; W. James Brady, III; Frederick J. Telecky, Jr.

(57) ABSTRACT

A system for digitizing voiceband signals at the remote terminal (20) of a Digital Subscriber Line (DSL) connection and embedding the digitized voiceband component into an active DSL data stream using a DSL modem (24). Voiceband transmissions between the remote terminal (20) and the central office call switching equipment (1) occur in the analog domain when the DSL modem (28) is OFF and in the digital domain when the DSL modem (28) is ON with the digital voiceband signals transmitted over a DSL link. Preferably, the remote terminal (20) can drive a real analog telephone (30) by providing battery feed, ring-trip detection, off-hook detection and ringing generation (60) In-house 4-wire lines pairs (21, 23) are configured between the modem, telephones and computer or home network to permit all digital transmission from the subscriber to the central office.

20 Claims, 4 Drawing Sheets

SYSTEM AND METHOD OF TRANSMITTING VOICE OVER DIGITAL SUBSCRIBER LINE

This application claims priority under 35 USC § 119(e)(1) of provisional application number 60/073,666, filed Feb. 4, 1998.

TECHNICAL FIELD

The present invention relates in general to communications using existing telephone wire and more particularly to a system that digitizes voiceband signals and transmits them over a digital subscriber line (DSL) using a DSL modem or other similar DSL device.

BACKGROUND OF THE INVENTION

The increased use of telephone twisted pair wiring for data communications has resulted in a push for faster modems and improved signaling protocols compatible with the public switch telephone network (PSTN). An example includes the emerging variety of the DSL communications protocols including asymmetric digital subscriber line (ADSL), symmetric digital subscriber line (SDSL), high bit rate digital subscriber line (HDSL), and very high rate digital subscriber line (VDSL). Each DSL variant represents a different transmission speed over possibly different distances of copper pair wiring usually for different applications.

In principle, a DSL modem and a plain old telephone system (POTS) or other voiceband device can operate simultaneously over the same twisted pair connection since they use different frequency bands. The connection, however, of a POTS to the same wire line pair as a DSL modem can suffer from several problems that result from the change in input impedance of the POTS equipment as it is added to the line. In essence, most POTS equipment is not designed to handle frequencies outside the voiceband of 300–3.4 kHz. In addition, POTS equipment often contains nonlinear components that may create intermodulation and harmonic interferences. Examples of such nonlinear components include Zener diodes, transistors, varistors, triacs, and other devices used for overvoltage protection, sidetone generation and overvolume protection.

As the shift to all digital communications continues, the POTS, due to its large installed base and widespread application may represent the final analog domain of telephony. Eventually, the industry may adopt a network that is entirely digital and DSL will eventually be the standard of choice. However, with the rapid growth of the Internet, high speed DSL modems might first dominate the telephone wires. One of promised DSL techniques is Asymmetrical Digital Subscriber Lines (ADSL). ADSL is an ANSI standard (T1E1.4–T1.413) issued in 1995 which presents the electrical characteristics of the Asymmetric Digital Subscriber Line signal appearing at the network interface.

While a known prior art technology, called Digital Pair Gain Device, can utilize one wire line pair to carry multiple voice channels, it requires that the connection be routed through an Integrated Service Digital Network (ISDN). The central office terminal emulates a telephone set for ring detection and hold purposes. On the other hand, the remote terminal at home drives a real analog phone by providing battery feed, off-hook detect, ring-trip detect, and ringing generation. The system requires a high frequency modem solely for its voice channels.

While ISDN is another typical DSL application, its limited data rate is not good for future Internet access. A fully digital telephony solution based on DSL, however, would be more advantageous. The integration of high speed modems and digital voice is important in today's consumer market and for applications such as 6-Mbps ADSL and voice over IP.

SUMMARY OF THE INVENTION

The invention provides a system for digitizing voiceband signals at the remote end of a Digital Subscriber Line (DSL) connection and embedding the digitized voice component into an active DSL data stream using a DSL modem. Voiceband transmissions between the remote terminal and the central office occur in the analog domain when the DSL modem is OFF and in the digital domain when the DSL modem is ON with the digital voiceband signals transmitted over a DSL link. With the DSL link active, the remote terminal communicates directly with the analog telephone equipment connected to the in-house 4-wire lines by providing battery feed, ring-trip detection, off-hook detection and ringing generation. In-house 4-wire lines provide connections between the DSL modem, telephones and computer or home networking equipment. A switching scheme enables a powered up DSL modem to control the analog equipment.

According to one embodiment, disclosed is a remote terminal for transmitting voiceband signals over a digital subscriber line (DSL) with the DSL coupled to a wire line pair connection providing a communications link from at least one voiceband device (such as a standard subscriber side telephone) and one digital data device (such as a desktop computer) to a central office facility. The remote terminal comprises a voice frequency interface with first and second terminals, the first terminal coupled to the voiceband device. A digital data interface with first and second terminals is also provided, the first terminal coupled to the digital data device. The device also includes a means of digitizing voiceband signals, such as an analog-to-digital signal converter, with an input terminal coupled to the second terminal of the voice frequency interface and an output terminal.

The device further includes a DSL compliant device, such as a DSL modem, with first, second and third terminals, the first terminal being coupled to the digital data interface for communicating with a digital data device such as a computer, the second terminal coupled to the output terminal of the means of digitizing voiceband signals and the third terminal coupled to the wire line pair connecting the customer premise to the central office. Essentially, the DSL compliant device is configured to receive digitize voiceband signals and intersperse them into the upstream DSL signal stream to the central office facility. The means for digitizing voice band signals is configured to present the same line conditions to the voice band component as it expects to see when the DSL compliant device is turned OFF.

According to another embodiment, disclosed is a central office call switching device comprising a line interface and a signal converter with analog and digital terminals, the analog terminal coupled to the line interface in a first operating state of the device. A digital subscriber line (DSL) compliant device with first, second and third terminals is also provided, the first terminal coupled to the digital terminal of the signal converter, the second terminal coupled to the line interface in a second operating state.

The central office call switching device also includes a digital interface with first and second terminals, the first terminal coupled to the third terminal of the DSL compliant device, the second terminal providing a signal pathway to at least one digital backplane, such as an Internet Protocol (IP) network. A voice frequency interface with first and second terminals is further provided, the first terminal coupled to the analog terminal of the signal converter.

Further disclosed are wiring configurations for coupling a remote terminal capable of digitizing voiceband signals and transmitting them in a DSL data stream utilizing the wire line pairs existing on the subscriber side of the network. According to one configuration, a voice frequency interface has a first terminal coupled to the subscriber POTS and a second terminal to a digitizing voiceband function through an existing, often unused, wire line pair. The switching mechanism, depending on the state of the remote terminal, can create a signal path from the POTS through a DSL compliant device in the remote terminal. If the remote terminal DSL complaint device is powered down, the switching mechanism will bypass the remote terminal entirely for normal voiceband operation.

According to another configuration, the voice frequency interface is split into two interfaces with the POTS coupled to one of the interfaces and a digital processing system to the second interface. Instead of coupling the processing system to the DSL device, the switching mechanism operates the transitions between the all-DSL state and the normal POTS voiceband operation.

According to another embodiment, the POTS is permanently coupled to the DSL device in the remote terminal and the DSL compliant device (DSL modem) at the subscriber side is always turned ON with the second wire line pair never used.

BRIEF DESCRIPTION OF THE DRAWINGS

Other aspects of the invention including specific embodiments are understood by reference to the following detailed description taken in conjunction with the appended drawings in which.

References in the detailed description correspond to like references in the figures unless otherwise indicated.

DETAILED DESCRIPTION OF PREFERRED EMBODIMENTS

The present invention provides a general architecture and system for transmitting voiceband signals within a digital subscriber line (DSL) data stream. The architecture may be adopted and utilized within an ADSL transmission unit (ATU), either central or remote, to provide end-to-end communications between a subscriber and a central office facility over a wire line pair. The switching mechanism provides the means by which a DSL modem can disconnect the local telephone equipment from the incoming telephone line and provide power and other typical line conditions to the telephone equipment.

Figure 1:
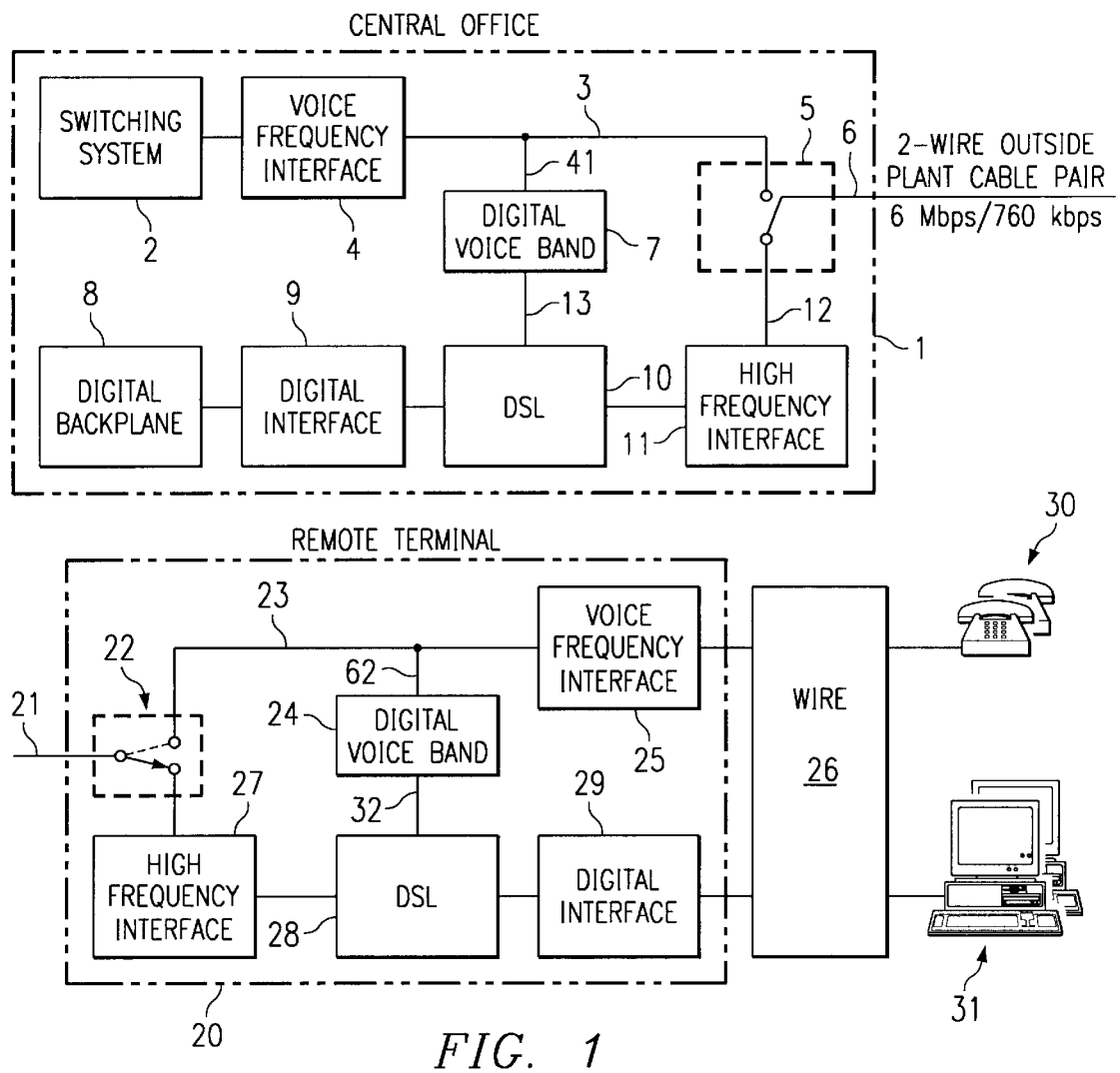
FIG. 1 is a block diagram of the central office and remote terminal equipment according to the invention.

With reference to FIG. 1, therein are shown block diagrams of both the central office (CO) 1 and remote terminal (RT) 20 according to the invention. A two wire outside wire pair 6 provides the physical connection to the customer premise equipment on the subscriber side of the network. The wire line pair 6 is coupled to the CO call switching equipment within the CO 1. A high frequency interface 11 is coupled to the wire line pair 6 through a switching mechanism 5.

In essence, the switching mechanism 5 provides a means of altering the signal path of signals flowing through the wire line pair 6, either to the DSL compliant device 10 (which is probably a DSL modem or linecard) through the high frequency interface 11, or to both the voice frequency interface 4 and the DSL compliant device 10. Typically, communications between the CO 1 and the remote terminal 20 are bidirectional, i.e., both in the upstream and downstream directions. For the purpose of this description, the terms CO and CO call switching equipment will be used interchangeably and associated to reference numeral 1 of FIG. 1.

Typically, the wire line pair 6 comprises a single twisted copper wire line pair of the type found in many Public Switched Telephone Networks (PSTN). The wire line pair 6 can be switchingly engaged to the analog terminal 3 of the digital voiceband unit (DVB) 7 through the switching mechanism 5. In this configuration, the switching mechanism 5 places the central office switching equipment 1 in a normal Voiceband (VB) operating state. In the VB state, analog signals within the voiceband (approximately 0–3.4 kHz) are switched from one voiceband device, such as a POTS 30, to a second voiceband device (not shown) through the CO 1 using switching system 2. The operation of the switching system 2 within the CO 1 is well known to those familiar with the facilities of the PSTN.

In the second operating state of the call switching equipment 1, the remote terminal 20 is transmitting voiceband signals embedded in a DSL data stream. Thus, the wire line pair 6 is coupled to terminal 12 of the high frequency interface 11 establishing an all DSL operating state within the CO call switching equipment 1. In the all DSL operating state, all signals over the wire line pair 6 enter the high frequency interface 11 (including digitized voiceband signals embedded in the DSL signal stream) and are received by the DSL compliant device 10. The DSL compliant device 10 can be a DSL modem, linecard, rack or other similar communications device within the CO 1.

In a normal operating state, or voiceband (VB) operating state, the switching mechanism 5 creates a signal path between the wire line pair 6 and the analog terminal 3 of the DVB 7. The VB operating state is the default condition of the network when the DSL compliant device 28 of the remote terminal 20 is turned OFF. Thus, the switching mechanism 5 connects the signals of the wire line 6 either to the DSL compliant device 10 or the voice frequency interface 4 through analog terminal 3.

The main function of the DVB 7 is to create a digital data representation of analog signals which arrive over the analog terminal 3 from the switching system 2 as well as to convert digitized voiceband signals transmitted over the DSL link to their corresponding analog counterpart that can be sent to the voice frequency interface through terminal 41. This permits connection of the analog side of the switching system 2 with the all digital side from the CO 1 which extends to the subscriber when the DSL device 28 in the remote terminal 20 is turned ON.

The signal path 13 couples the digital terminal of the DVB 7 to a DSL compliant device 10 within the CO switching equipment 1. In the all DSL operating state, the DVB 7 and DSL compliant device 10 provide a way of digitizing the analog signals arriving from the switching system 2 and then embedding and transmitting the digitized voiceband in a DSL data stream transmitted over the wire line pair 6 leading to the remote terminal 20.

DVB 7 and the DSL compliant device 10 also provide a similar digital-to-analog function in the upstream direction as digitized voiceband signals received from the remote terminal 20 over the DSL link are converted to corresponding voiceband signals which are directed to the analog voice frequency interface 4. The digital interface 9 provides the connection mechanism to the digital back plane 8 which can lead, for example, to an Internet service provider or other digital protocol network. Likewise, in the upstream direction, VB signals on the analog terminal 3 are directed to the voice frequency interface 4 which provides the routing mechanism to the switching system 2 leading to a PSTN (not shown). The switching system 2 represents the typical switching facilities of the PSTN that permits switched connections to be established among users of the traditional Plain Old Telephone System (POTS) 30.

The remote terminal 20 is shown in the bottom half of FIG. 1 as having a similar configuration to the central office switching equipment 1. In particular, the other end of the wire line pair 21 enters the remote terminal 20 through the switching mechanism 22 that creates the appropriate signal path depending on the operating state of the remote terminal 20. Where the remote terminal 20 operates in the all DSL operating state, the switching mechanism 22 creates a signal path through the high frequency interface 27 leading to the DSL compliant device 28 within the remote terminal 20. As before, the DSL compliant device 28 can be any one of various DSL devices including DSL modems, transceivers and other similar equipment.

The high frequency interface 27 provides a DSL pass band function centered about those frequencies within the DSL spectrum. The frequencies in the high frequency interface can be fixed or can be adaptively selected. Next, digital signals from the wire line pair 21 reaching the high frequency interface 27 are received by the DSL compliant device 28 where they are converted and relayed to either the digital voiceband unit (DVB) 24 or the digital interface 29 depending on the signal content of the incoming signal stream.

In this way, digitized voiceband signals can be embedded within a DSL data stream and transmitted using the DVB 24 over signal path 32. The DVB 24 receives digital representations of voiceband signals and converts them into analog equivalent signals which are output on the analog terminal 23 via signal path 62 and received by the voice frequency interface 25 leading to the wire concentrator 26 within the subscriber premises.

The remote terminal 20 includes a voice frequency interface 25 and a digital interface 29 to the wire concentrator 26. In one embodiment, the wire concentrator 26 comprises the already existing telephone wiring which permits the remote terminal 20 to utilize the existing installation at a customers home or business. In another embodiment, the wire concentrator 26 is specifically designed (see FIGS. 4 through 7) and configured to isolate the voiceband device 30 from the digital data device 31.

The subscriber POTS equipment 30 in the customer premises is coupled to the wire concentrator 26 in either operating state of remote terminal 20. The POTS equipment 30 is presented with the same line characteristics found in the PSTN. Thus, in the all DSL operating state, the DVB 24 is able to provide the same impedance and central office line voltage levels for which the POTS equipment 30 was designed to operate.

When the switching mechanism 22 creates a signal path through the analog terminal 23, the switching mechanism 5 in the central office switching equipment 1 creates a path with the analog terminal 3 thereby establishing a typical voiceband connection. This operating condition is often referred to as the "life line" state since the call switching equipment 1 presents a constant source of line voltage (typically 48 volts) which allows the POTS 30 at the subscriber site to be utilized even in times when the power is interrupted. According to the invention, the switching mechanisms 5 and 22 are configured to permit life line operation of the POTS 30 so that communications are maintained in the event power is lost on the subscriber side of the network. Thus, the central office call switching equipment 1 and remote terminal 20 include the capability of providing the identical line characteristics to the POTS 30 even in the all DSL operating states, eliminating the standard requirement for upgrading POTS equipment to operate properly with the context of the invention.

In addition, the invention contemplates maintaining the line impedance voltage characteristics as the POTS 30 transitions from on-hook to off-hook, during retrain or power cutbacks, data rate reductions of the DSL compliant device 28 and other operating conditions of the remote terminal 20. In the all DSL operating state, the switching mechanisms 5 and 22 act to disconnect the power supply at the CO 1 and permit the POTS 30 to be connected directly to the remote terminal 20 or a DSL modem incorporating the functionality and architecture of the remote terminal 20.

Figure 2:
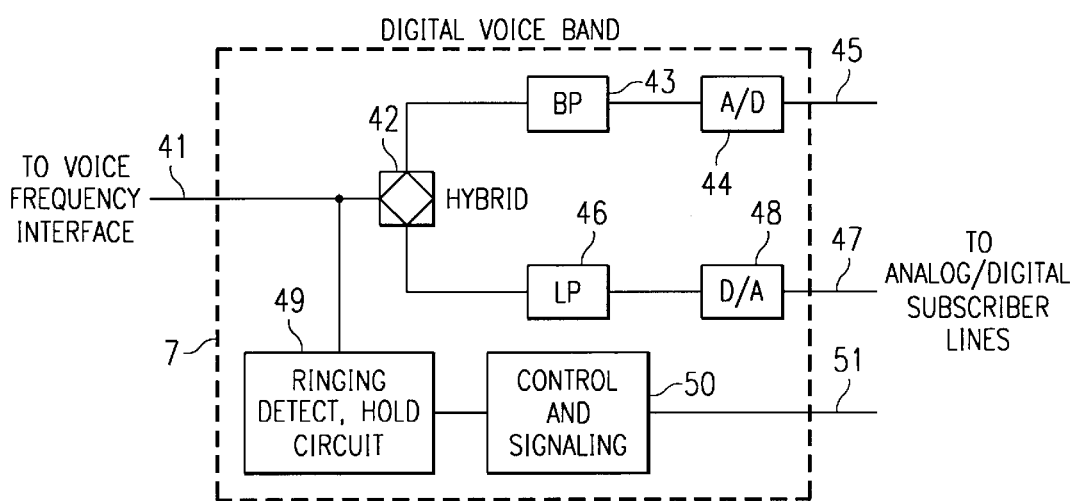
FIG. 2 illustrates the general overview of the voiceband line card for the central office.

Turning now to FIG. 2, the general architecture of the DVB 7 in the CO 1 is shown. The DVB 7 includes three terminals 41, 45, and 47 and a control interface 51. In particular, terminal 41 provides a signal pathway for voiceband signals communicated between voice frequency interface 4 and DVB 7. Terminals 45 and 47 form the signal paths of the communications link 13. In the downstream direction, voiceband signals from the voice frequency interface 4 reach the hybrid circuit 42 which provides the 2-wire to 4-wire interface mechanism within the CO switching equipment 1.

In the all DSL operating state, voiceband signals are directed to the band pass filter 43 which performs the voiceband filtering and anti-aliasing functions on the incoming analog signals and presents a band-limited voiceband signal to the analog-to-digital (A/D) converter 44. The A/D converter 44 can sample the incoming analog signal and create a digital representation of the signals at terminal 45. The digital signals are then made available to the DSL compliant device 10 through communications link 13.

In the upstream direction, digitized voiceband signals arrive into the DVB 7 via the terminal 47 and pass through digital-to-analog (D/A) converter 48 and then through low pass filter 46 and into the hybrid circuit 42. The converted signal wave forms then reach the voice frequency interface 4 through terminal 41.

Also found within the DVB 7 is a ring detect and hold circuit 49 which permits the DVB 7 to determine when an incoming call is received at the CO 1. The implementation and utilization of the ring detect and hold circuit 49 is well known to those of ordinary skill. A control and signaling function 50 is provided within the DVB 7 which allows external operation of the DVB 7 depending on the operating state of the central office switching equipment 1. The DVB 7 is connected to the switching system 2 within the central office equipment 1 through the voice frequency interface 4 when the DSL compliant device 28 is turned ON. The DVB 7 can emulate a telephone set by providing ring detection and signal hold at the ring detect hold circuit 49. Thus, all voiceband signals can be digitized and transmitted using the DSL compliant device 10.

Figure 3:
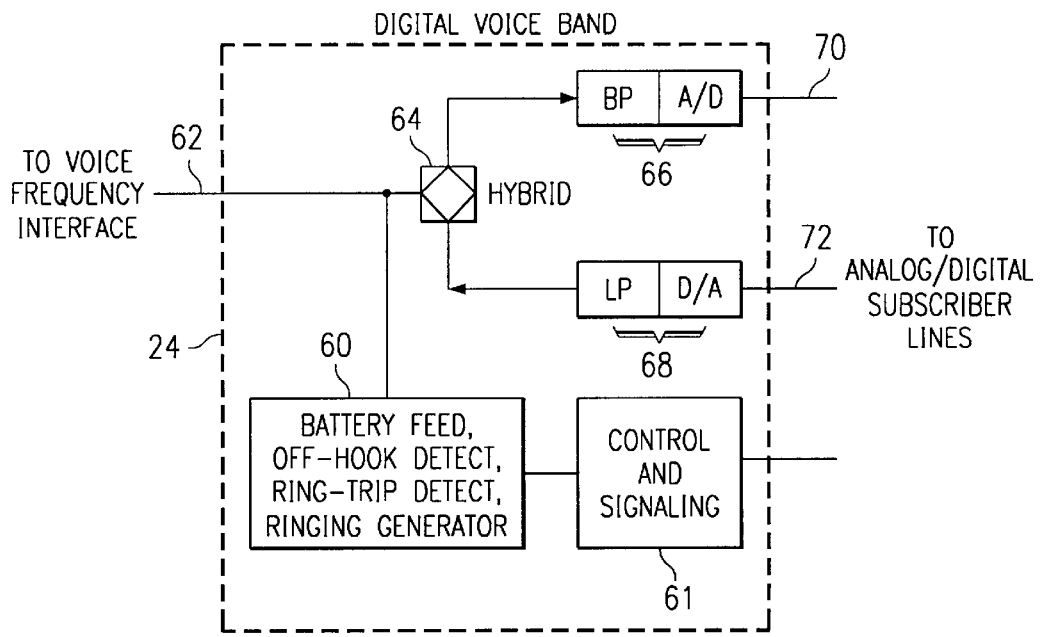
FIG. 3 illustrates the digital voiceband portion of the remote terminal.

The general architecture of the DVB 24 within the remote terminal 20 is shown in more detail in FIG. 3. An important aspect of the remote terminal 20 is that it be able to deliver similar transmission line characteristics which the POTS equipment 30 is used to seeing This aspect of the invention is provided through the battery feed, off-hook detect ring trip detect and ring generator circuit 60 which emulates many of the functions of a typical central office facility. For example, the line voltage over a typical PSTN wire line pair is 48 volts from the CO 1 to the POTS 30 at the subscriber side of the loop. Battery feed circuit 60 can provide such typical line voltages (with appropriate line losses) so that the POTS 30 is powered up in the off-hook state when the remote terminal 20 is operating in the all DSL state.

The voice frequency interface 25 is coupled to the DVB 24 at terminal 62 and reaches the hybrid circuit 64. The hybrid circuit 64 performs a 4 wire to 2 wire conversion on signals delivered to the DVB 24 through terminal 62. In the all DSL operating state, the voiceband signals are directed to the band pass and A/D block 66 which performs in a similar fashion to like components in the DVB 7 within the CO 1. The output of block 66 is directed to terminal 70 which is coupled to the DSL compliant device 28 through signal path 32 in the remote terminal 20. Terminals 70 and 72 represent the signal paths of the communications link 32 coupling the DVB 24 to the DSL compliant device 28.

In the downstream direction, digital signals from the DSL compliant device 28 arrive into the DVB 24 through terminal 72. These digital signals are digitized representations of voiceband signals intended for the POTS equipment 30. The digital signal stream enters the converter and filter section 68 within the DVB 24. In particular, block 68 within the DVB 24 performs similar functions to the components 46 and 48 within the DVB 7 of the central office 1. The output of block 68 are analog signals within the voiceband which are directed to the hybrid circuit 64 where they are eventually transferred to the voice frequency interface 25 of the remote terminal 20.

Figure 4:
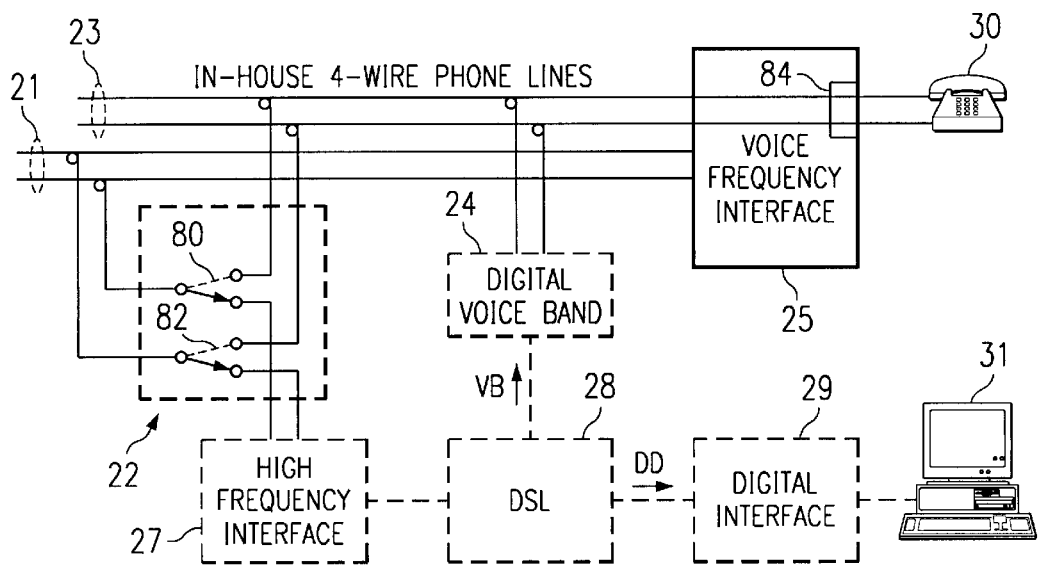
FIG. 4 illustrates the wiring scheme of an in-house four wire phone line for the remote terminal configuration.

Turning to FIG. 4, therein is shown a wiring configuration for an in-house four wire connection suitable for use with the remote terminal 20. A single wire line pair 21 is coupled to the voice frequency interface 25 within the remote terminal 20. The switching mechanism 22 comprises two independent switches 80 and 82 which toggle depending on the operating state of the remote terminal 20. Thus, in the all DSL operating state, the switches 80 and 82 form signal paths from the high frequency interface 27 to the wire line pair 21.

In the all-DSL operating state, the DSL data stream enters the DSL compliant device 28 where it is processed and decomposed into its voiceband (VB) and digital data (DD) components. The VB component is relayed to the DVB 24 which, in turn, is coupled to a second wire line pair 23 found in common subscriber site installations. Thus, the wiring configuration of FIG. 4 takes advantage of the second wire line pair 23 which often goes unused or is reserved for emergency based services such as automatic alarm and burglar detection systems.

As before, the DVB 24 presents typical power supply and line characteristics which the POTS equipment 30 requires for proper operation according to its design. The VB component of the DSL data stream is received by the POTS equipment 30 through the voice frequency interface 25 which is unaware of its origin.

The DD component of the DSL data stream is transferred to the digital interface 29 and is made available to a digital data device 31 which can be a computer, workstation, digital receiver or other similar digital component. Given the rapidly emerging DSL applications, it is envisioned that the digital data device 31 can comprise a wide array of equipment utilized at the subscriber premises designed to utilize any one or more of the DSL variant protocols.

In one embodiment, the voice frequency interface 25 includes a special jack 84 which allows the POTS 30 to utilize the unused wire line pair 23. The jack 84 would couple the pins on the plug from the POTS equipment 30 (usually an RJ-11 plug) to the unused pair 23. In other embodiments, the voice frequency interface 25 can employ other switching techniques in order to connect voiceband signals from the POTS to the DVB 24 in the all DSL operating state of the remote terminal 20 to equipment 30 make the connection.

Figure 5:
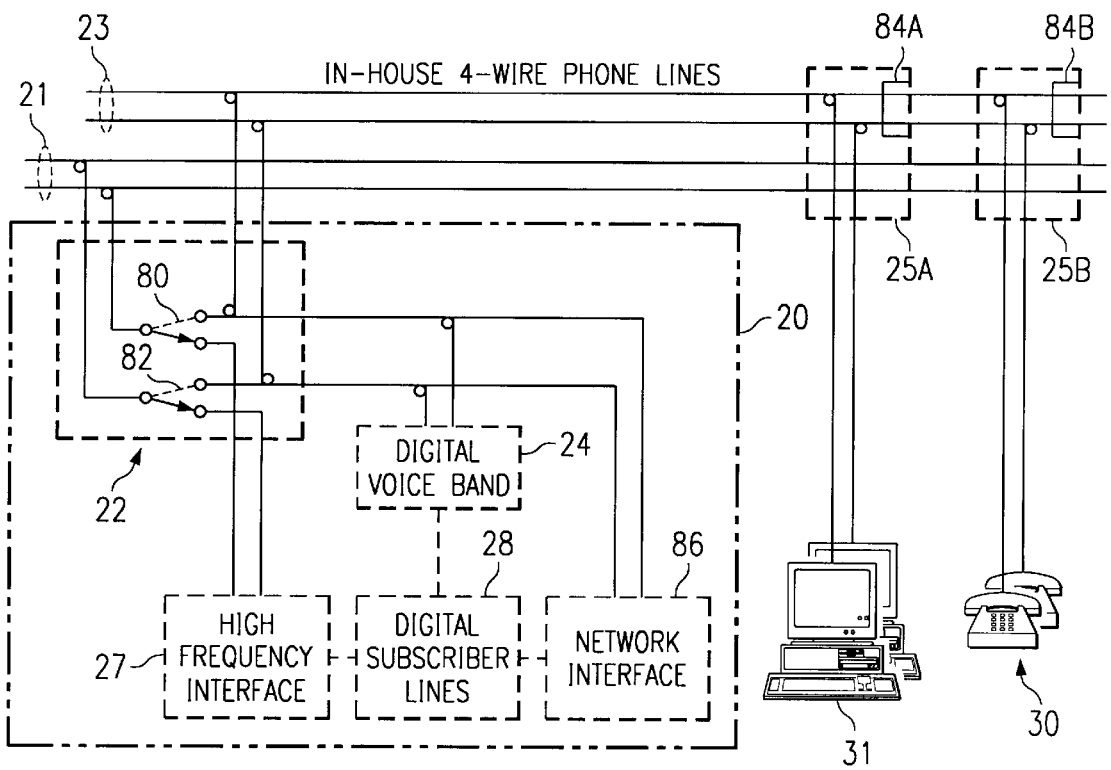
FIG. 5 illustrates the wiring scheme of the in-house four wire phone line for the RT configuration when the network interface is connected to the same wire line pair.

FIG. 5 shows an alternative wiring configuration for the remote terminal 20 according to still another embodiment of the invention. The switching mechanism 22 still comprises two separate switches 80 and 82 which determine the operating state of the remote terminal 20 as well as the signal path of signals to and from the remote terminal 20. The distinction lies in the use of multiple voice frequency interfaces 25a and 25b which are used to couple the digital data device 31 and POTS 30, respectively, to the in-house wire line pairs 21 and 23. Thus, the transitions from a voiceband operating state to the all DSL operating state occurs as switches 80 and 82 toggle from the high frequency interface 27 and the typically unused wire line pair 23.

The configuration of FIG. 5 presumes that the remote terminal 20 operates in the all DSL operating state or that the CO call switching equipment 1 is able to decipher the incoming data stream arriving from the digital data device 31 or the POTS equipment 30 over the wire line pair 21 when the remote terminal 20 is operating in normal voice band.

Figure 6:
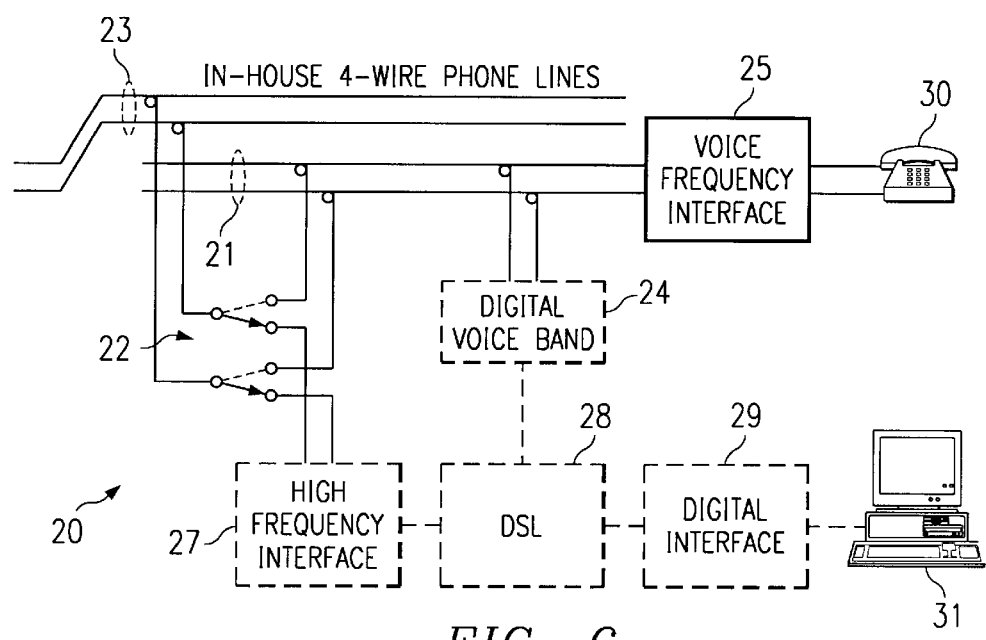
FIG. 6 illustrates the wiring scheme of the in-house four wire phone line for the remote terminal configuration where the subscriber line is connected to a second wire line pair.

The wiring configuration of FIG. 5 is contrasted with the configuration shown in FIG. 6 wherein the primary connection to the central office is now the typically unused wire line pair 23. In this case the voice frequency interface 25 can present the exact jack configuration which the POTS equipment 30 is designed to accept. The switching mechanism 22 handles the transition between states by switching the incoming wire line 23 from the CO 1 between the standard utilized wire line pair 21 when the DSL compliant device 28 is turned OFF to the high frequency interface 27 when the compliant device 28 is ON. Thus, in the all DSL operating state, the DVB 24 receives signals from the standard wire line pair 21 and drives the POTS equipment 30.

Figure 7:
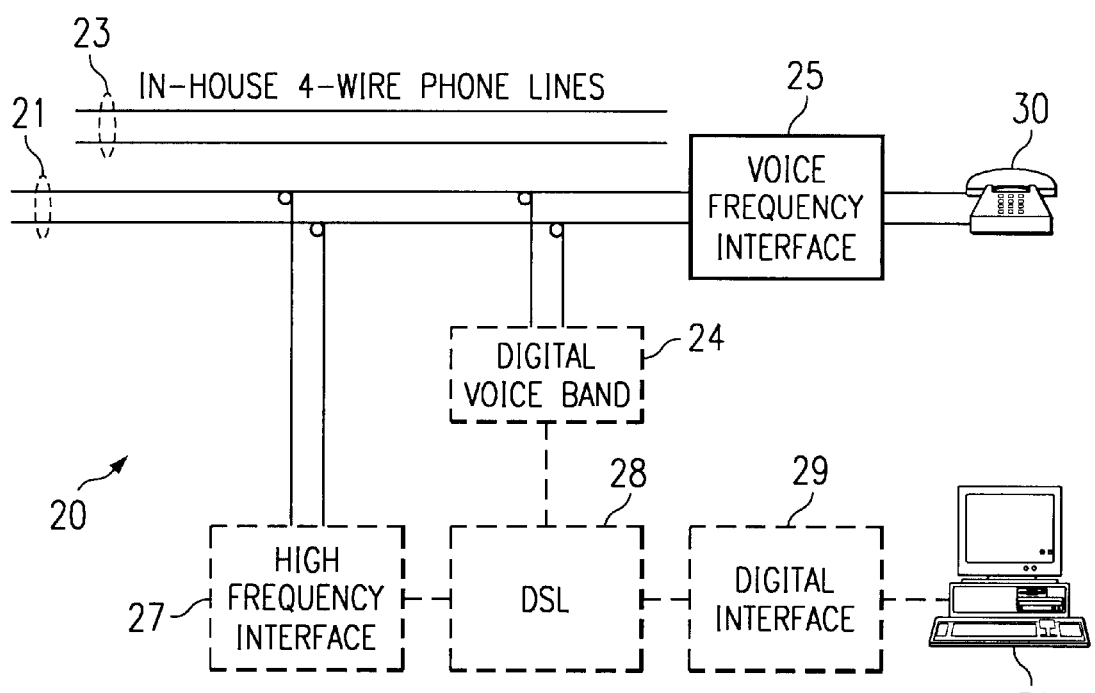
FIG. 7 illustrates the wiring scheme for the remote terminal where the DSL compliant device and voiceband device use the same wire line pair but the voice frequency interface behaves as a low pass filter.

Another embodiment of a wiring configuration within the subscriber premises is illustrated in FIG. 7. In this embodiment, the DSL compliant device 28 and POTS equipment 30 are utilizing the same wire line pair 21 found in a typical business installation. The voice frequency interface 25 can behave as a low pass filter passing only those signal components within the voice band. Since all signal traffic is directed into the DVB 24, it is assumed that the DSL compliant device 28 is always ON providing a continuous DSL operating state of the remote terminal 20. This is a good configuration for voice over IP applications where all voice data is carried from end to end in a digital format.

While the invention has been described with reference to preferred embodiments it should be understood that modifications will become apparent to those of ordinary skill of the art and that such modifications are intended to be included within the scope of the invention as defined by the following claims.

What is claimed is:

1. In a communications system, a remote terminal for communicating voiceband signals over a digital subscriber line (DSL), the DSL coupled to a wire line pair connection providing a communications link from at least one voiceband device and one digital data device to a central office facility, the remote terminal comprising:
   a voice frequency interface with first and second terminals, said first terminal coupled to said voiceband device;
   a digital data interface with first and second terminals, said first terminal coupled to said digital data device;
   a means of digitizing voiceband signals having an input terminal coupled to said second terminal of said voice frequency interface and an output terminal; and
   a DSL compliant device with first, second and third terminals, said first terminal coupled to said digital data interface for communicating with said digital data device, said second terminal coupled to said output terminal of said means of digitizing voiceband signals and said third terminal coupled to said wire line pair connection;
   wherein said DSL compliant device is configured to accept as input the digitized voiceband signal components from said means of digitizing voiceband signals and intersperse them into a DSL signal stream transmitted to the central office facility.

2. The remote terminal according to claim 1 further comprising a high frequency interface interspersed between said third terminal of said DSL compliant device and said wire line pair connection.

3. The remote terminal according to claim 2 wherein said high frequency interface comprises a high pass filter tuned to pass DSL signal components.

4. The remote terminal according to claim 1 further comprising a first switching mechanism interspersed between said DSL compliant device and said wire line pair connection.

5. The remote terminal according to claim 4 wherein said switch mechanism includes first, second and third terminals, said first terminal coupled to said second terminal of said voice frequency interface, said second terminal coupled to said third terminal of said DSL compliant device and said third terminal coupled to said wire line pair connection.

6. The remote terminal according to claim 5 wherein said switch mechanism allows said voice band device to operate in a life line state by making establishing a connection between said first and third contacts of said switch mechanism.

7. The remote terminal according to claim 5 wherein said switch mechanism causes a connection to exist between said second and third contacts of said switch mechanism.

8. The remote terminal according to claim 1 wherein said means of digitizing voiceband signals includes an analog to digital converter capable of producing a 64 kbps digitized voiceband data stream.

9. The remote terminal according to claim 1 wherein said means of digitizing voice band signals is configured to present the typical line characteristics found over a twisted pair connection of the PSTN.

10. The remote terminal according to claim 7 wherein said voice frequency interface presents a 48 volt line voltage to said voiceband device when a connection exists between said second and third contacts of said switch mechanism.

11. The remote terminal according to claim 1 further comprising a wire concentrator interspersed between said voice frequency interface adjacent said digital data interface and said voiceband and digital data devices.

12. The remote terminal according to claim 11 wherein said wire concentrator is configured to switch signals away from said voiceband device to said digital data interface.

13. A central office call switching device comprising:
   a line interface;
   a voice frequency interface for communicating analog signals to and from an analog switching system;
   a signal converter with analog and digital terminals, said analog terminal coupled to the voice frequency interface, the signal converter for converting analog signals received from the voice frequency interface into digital data for presentation at its digital terminal, and for converting digital signals received at its digital terminal into analog signals for forwarding to the voice frequency interface;
   a digital subscriber line (DSL) compliant device with first, second and third terminals, said first terminal coupled to said digital terminal of said signal converter;
   a digital interface with first and second terminals, said first terminal coupled to said third terminal of said DSL compliant device, said second terminal providing a signal pathway to at least one digital backplane; and
   a switching mechanism for coupling the line interface to the second terminal of the DSL compliant device in a DSL operating state, and for coupling the line interface to the voice frequency interface in a voiceband operating state.

14. The central office switching device according to claim 13 further comprising an analog switching system coupled to the voice frequency interface.

15. The central office switching device according to claim 13 further comprising a high frequency interface coupled between said DSL compliant device and said switching mechanism.

16. The central office call switching device according to claim 15 wherein said high frequency interface includes a DSL band pass filter.

17. A communications network for communicating voiceband signals over a Digital Subscriber Line (DSL) transmission link comprising:
   a remote terminal configured to receive analog voiceband signals from at least one voiceband device, convert them into corresponding digital signals and embed them into the DSL data stream transmitted over said transmission link, comprising:
     a voice frequency interface with first and second terminals, said first terminal coupled to the voiceband device;
     a digital data interface with first and second terminals, said first terminal coupled to a digital data device;

means for digitizing voiceband signals, having an input terminal coupled to said second terminal of said voice frequency interface and an output terminal; and a DSL compliant device, having a first terminal coupled to said digital data interface for communicating with said digital data device, a second terminal coupled to said output terminal of said means of digitizing voiceband signals, and a third terminal coupled to said wire line pair connection, for interspersing the digitized voiceband signal components from said means of digitizing voiceband signals into a DSL signal stream to be transmitted over the DSL transmission link; and a central office containing call switching equipment configured to communicate with said remote terminal over said DSL transmission link, said call switching equipment comprising:

a voice frequency interface for communicating analog signals to and from an analog switching system;

a signal converter having an analog terminal coupled to the voice frequency interface, the signal converter for converting analog signals received from the voice frequency interface into digital data for presentation at a digital terminal, and for converting digitized voice band signals contained in said DSL data stream and received at its digital terminal to corresponding analog voice band signals for forwarding to the voice frequency interface;

a digital subscriber line (DSL) compliant device having a first terminal coupled to said digital terminal of said signal converter;

a digital interface having a first terminal coupled to a second terminal of said DSL compliant device, and having a second terminal providing a signal pathway to at least one digital backplane; and a switching mechanism for coupling the line interface to a third terminal of the DSL compliant device in a DSL operating state, and for coupling the line interface to the voice frequency interface in a voiceband operating state.

18. The communications network according to claim 17 wherein said remote terminal is able to present the transmission line characteristics of twisted pair lines in a typical Public Switched Telephone Network (PSTN) installation.

19. The communications network according to claim 17 wherein said remote terminal is capable of switching between an all DSL operating state and a voiceband operating state.

20. The communications network according to claim 17 wherein call switching equipment contains a first interface to a digital backplane network and a second interface to a switched analog network.

* * * * *